(12) United States Patent
Lindacher

(10) Patent No.: US 8,152,300 B2
(45) Date of Patent: Apr. 10, 2012

(54) PREMIUM VISION OPHTHALMIC LENSES

(75) Inventor: Joseph Michael Lindacher, Suwanee, GA (US)

(73) Assignee: Novartis AG, Basel (SE)

( * ) Notice: Subject to any disclaimer, the term of this patent is extended or adjusted under 35 U.S.C. 154(b) by 310 days.

(21) Appl. No.: 11/958,685

(22) Filed: Dec. 18, 2007

(65) Prior Publication Data

US 2008/0143963 A1    Jun. 19, 2008

Related U.S. Application Data

(60) Provisional application No. 60/870,742, filed on Dec. 19, 2006.

(51) Int. Cl.
A61B 3/00 (2006.01)
A61B 3/10 (2006.01)

(52) U.S. Cl. .......................... 351/246; 351/205; 351/221

(58) Field of Classification Search .................. 351/200, 351/205, 221, 246–247
See application file for complete search history.

(56) References Cited

U.S. PATENT DOCUMENTS

| | | | |
|---|---|---|---|
| 5,777,719 A | 7/1998 | Williams et al. | 351/212 |
| 6,183,084 B1 * | 2/2001 | Chipman et al. | 351/176 |
| 6,398,809 B1 * | 6/2002 | Hoffmann et al. | 623/6.49 |
| 6,499,843 B1 * | 12/2002 | Cox et al. | 351/246 |
| 6,786,603 B2 | 9/2004 | Altmann | 351/246 |
| 7,111,938 B2 | 9/2006 | Andino et al. | 351/212 |
| 7,118,214 B2 | 10/2006 | Cox | 351/161 |
| 7,137,702 B2 | 11/2006 | Piers et al. | 351/177 |
| 7,213,918 B2 * | 5/2007 | Phelan | 351/177 |
| 2004/0233382 A1 | 11/2004 | Lindacher et al. | 351/160 |
| 2006/0244916 A1 * | 11/2006 | Guillon | 351/246 |
| 2006/0274268 A1 * | 12/2006 | Andino et al. | 351/212 |

FOREIGN PATENT DOCUMENTS

| | | |
|---|---|---|
| WO | WO 98/27863 | 7/1998 |
| WO | WO 02/088830 | 11/2002 |
| WO | WO 2004/072709 | 8/2004 |
| WO | WO 2005/015289 | 2/2005 |

* cited by examiner

Primary Examiner — Dawayne A Pinkney
(74) Attorney, Agent, or Firm — Robert Ambrose

(57) ABSTRACT

An ophthalmic lens with premium vision corrections provides significantly improved visual acuity and contrast sensitivity. The premium vision corrections include precisely correcting for two aberration mode sets simultaneously, second-order astigmatism and fourth-order spherical aberration, instead of correcting for only second-order astigmatism or simultaneously correcting for all aberrations present. Fourth-order astigmatism, sixth-order spherical aberration, and third-order coma are additionally corrected in other premium vision correction schemes. In addition, methods are provided for prescribing and fabricating the premium vision lenses to permit mass customization.

28 Claims, 8 Drawing Sheets

FIG. 9
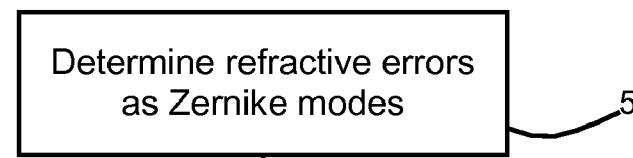
FIG. 10
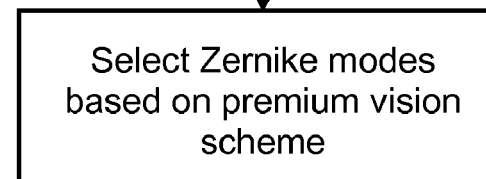
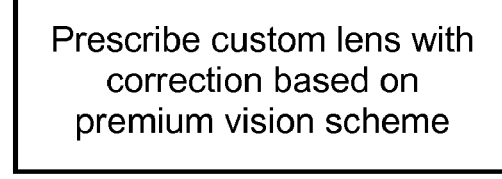
FIG. 11
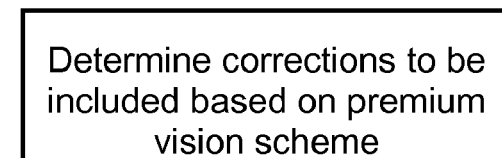
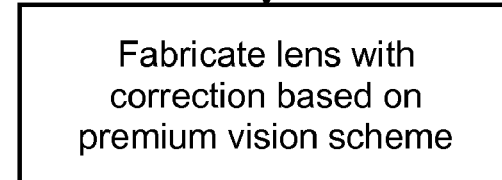

PREMIUM VISION OPHTHALMIC LENSES

This application claims the benefit under 35 USC §119 (e) of U.S. provisional application No. 60/870,742 filed Dec. 19, 2006, incorporated by reference in its entirety.

TECHNICAL FIELD

The present invention relates generally to the field of ophthalmic lenses and, more particularly, to correcting for aberrations in refractive surfaces of eyes to provide enhanced visual acuity and contrast sensitivity.

BACKGROUND OF THE INVENTION

Contact lenses are ophthalmic lenses worn on the anterior cornea that are widely used for correcting many different types of vision deficiencies. These include defects such as near-sightedness (myopia) and far-sightedness (hypermetropia), astigmatism, and defects in near-range vision usually associated with aging (presbyopia). A posterior surface of the contact lens fits against the cornea and an opposite anterior surface has an optical zone that refracts light to correct vision.

Astigmatism occurs when the refractive error in an eye is meridian-dependent. This is usually due to one or more refractive surfaces, most commonly the anterior cornea, having a toroidal shape. It may also be due to one or more surfaces being transversely displaced or tilted. Astigmatism is usually regular, which means that the principal (maximum and minimum power) meridians are perpendicular to each other. People with astigmatism have blurred vision at all distances, although the problem may be worse in their distance or near vision, depending on the type of astigmatism. These people may complain of sore eyes and headaches associated with demanding visual tasks.

Astigmatism can be corrected with contact lenses, usually having one spherical surface and one toroidal (sphero-cylindrical) surface. Due to limitations of traditional diagnostic devices such as phoropters, the astigmatic refractive errors traditionally corrected are second-order surface or wavefront functions, so conventional astigmatism correction with contact lenses is relatively invariant of registration to the eye's line-of-sight. However, the correction is dependent on lens rotation on the eye. So contact lenses with an astigmatism correction include an orientation feature to maintain a predetermined orientation on the eye.

The current industry standard is to provide contact lenses with astigmatic corrections beginning at −0.75 Diopter. Typically, one or two additional cylinder powers, in 0.5 or 0.75 Diopter steps, are offered. These corrections are included in lens series having spherical power corrections (for myopia or hypermetropia) in 0.25 Diopter increments. Typical parameter ranges include axes parameters in no finer than 10-degree increments. Patients are prescribed with lenses having whichever of these astigmatic corrections most closely matches the needs of each of their eyes. Typically, an astigmatic error of less than 0.75 Diopter is not corrected with contact lenses. More precise astigmatism correction has not been deemed practical or necessary.

In addition to second-order astigmatism, human eyes usually have a number of other aberrations in refractive surfaces, though mild amounts of such refractive errors are often asymptomatic or cause only generally tolerable vision deficiencies. Recent improvements in technology, such as ophthalmic wavefront sensors, have provided higher resolution than the standard sphero-cylindrical averaged refractive error. Zernike polynomials are typically used to describe refractive errors for on-axis optical systems. Zernike basis sets can accurately describe a map of the full refractive error. Until recently, the only Zernike mode, other than sphere, that was corrected with contact lenses was second-order astigmatism. Recent efforts are believed to have been directed to attempting to provide optimal vision by customizing contact lenses using a Zernike basis set to simultaneously cancel all of the measurable aberrations in a particular eye. But correcting for higher-order aberrations requires registration of the contact lens to the eye's line-of-sight. In addition, the resulting contact lenses have extremely complex surfaces, which are very costly and difficult to precisely manufacture.

Thus it can be seen that needs exist for improvements to ophthalmic lenses to correct for aberrations to provide premium vision. It is to such improvements that the present invention is primarily directed.

SUMMARY OF THE INVENTION

Generally described, in one aspect the invention provides a premium vision ophthalmic lens, such as a contact lens. The lens has a refractive surface with optic-power corrections for aberrations in refractive surfaces of the eye. The optic-power corrections are made according to a premium vision correction scheme in which simultaneous corrections are made for only selected aberrations, expressed as Zernike modes. The various example premium vision correction schemes described herein all include correcting for second-order astigmatism and fourth-order spherical aberration. Preferably, the corrections are made precisely to accurately cancel out all of the error, instead of in standardized Diopter increments, and are thus customized to the particular eye. A lens with such a precise correction for spherical and astigmatic aberrations provides significantly improved visual acuity and contrast sensitivity. Additional corrections may be included in the lens, such as for myopia, hypermetropia, presbyopia, or non-optic-power corrections.

In one example embodiment, the lens has corrections based on a premium vision correction scheme in which the only optic-power corrections are for second-order astigmatism and fourth-order spherical aberration. While others have corrected for only astigmatism or have corrected for all aberrations present in the eye, this embodiment corrects for only these two selected aberrations, yet provides significantly enhanced vision quality in a practical and cost-effective manner.

In other example embodiments, the lens has corrections based on other premium vision correction schemes. In these other schemes, the optic-power corrections further include at least one additional simultaneous correction, which can be fourth-order astigmatism, sixth-order spherical aberration, and/or third-order coma. No other aberrations are corrected under any of the included premium vision correction schemes.

In another aspect the invention provides a method of prescribing a customized ophthalmic lens with a premium vision correction. The method includes first determining the optic-power refractive aberrations in an eye of a patient, with the aberrations expressed as Zernike modes. This can be done by measuring astigmatism using a phoropter and estimating spherical aberration (and an other higher-order aberrations) using relevant data. Preferably, though, this is done by measuring all detectable aberrations using a wavefront sensor system.

The next step in the method of prescribing is selecting a premium vision correction scheme for simultaneously correcting at least two but preferably no more than five of the optic-power aberrations. Any of the premium vision correction schemes described herein can be used, and the selection is based on the type and magnitude of the aberrations in the particular eye, the needs of the patient, and cost considerations. And finally the method includes issuing a prescription to the patient for a lens with precise corrections for the selected aberrations. The method for prescribing can also include the additional steps of providing the patient with a test lens and then measuring the rotation and/or decentration of the lens on the eye. Then, when issuing the prescription, the method of prescribing can include prescribing the optic zones with the corrections for the aberrations being rotated and/or decentered to correspond to the measured test lens rotation and/or decentration In still another aspect the invention provides a method of manufacturing an ophthalmic lens with a premium vision correction. The method includes determining optic-power corrections to be included in the ophthalmic lens, with the corrections selected according to any of the premium vision correction schemes described herein. In a customized approach, this is done by prescribing a custom lens with precise corrections customized to the eye, as described in the corresponding method herein. Next, the method includes fabricating the lens with the selected corrections precisely made. This is preferably done using a single-point diamond cutting system. In addition, the lens is preferably fabricated of lathable silicon hydrogel.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 9 is a side view of an exemplary contact lens with a refractive surface having the corrections specified in any of the example premium vision correction schemes according to the invention.

FIG. 10 is a flow diagram of a method of prescribing an ophthalmic lens with a premium vision correction according to the invention.

FIG. 11 is a flow diagram of a method of manufacturing an ophthalmic lens with a premium vision correction according to the invention.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Any methods may be performed in sequences other than those listed, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Unless defined otherwise, all technical and scientific terms used herein have the same meaning as commonly understood by one of ordinary skill in the art to which this invention pertains. Generally, the nomenclature used herein and the manufacturing procedures are well known and commonly employed in the art. Conventional methods are used for these procedures, such as those provided in the art and various general references.

Figure 1:
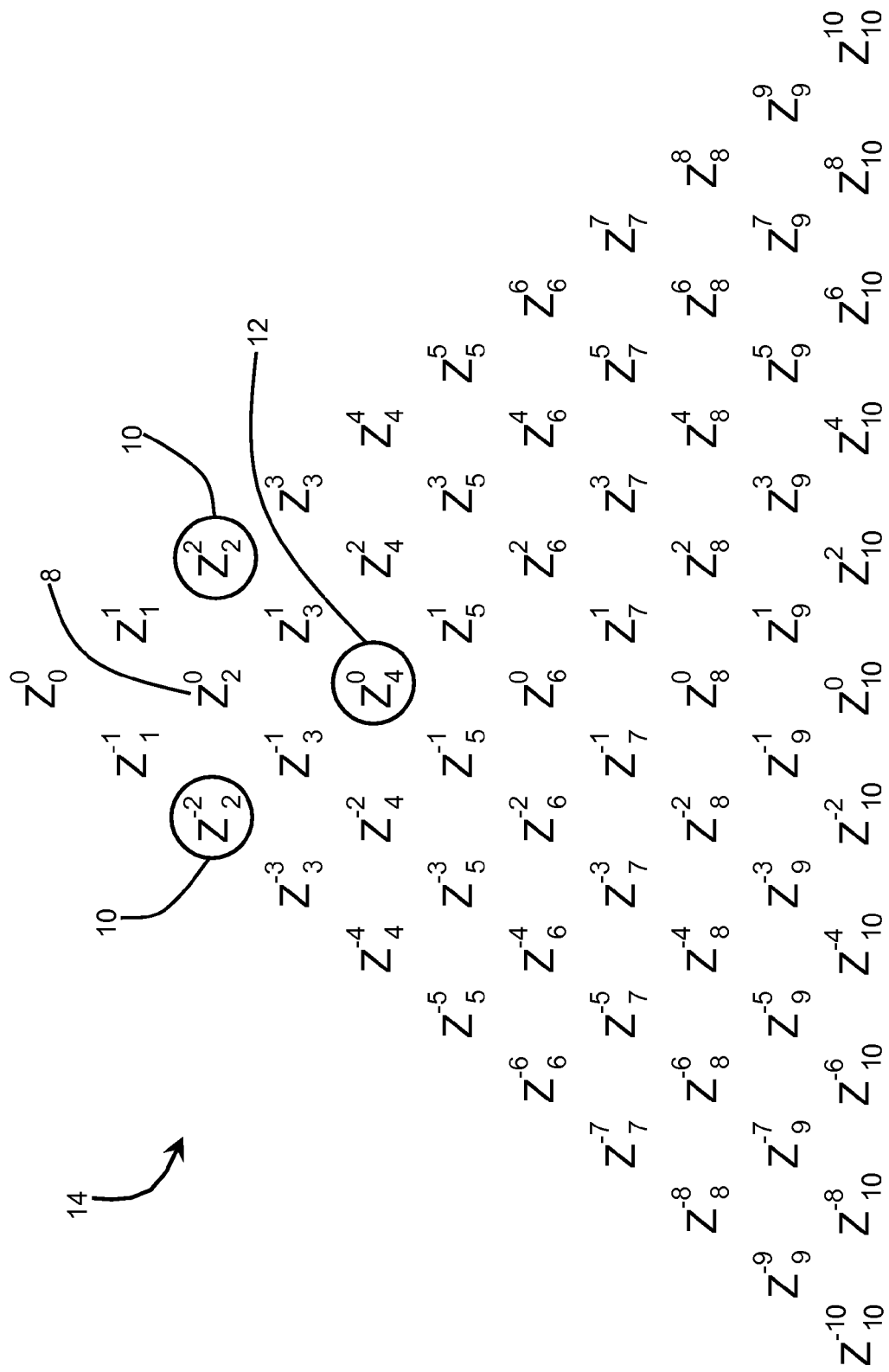
FIG. 1 is a graphical depiction of Zernike modes arranged in a pyramid, showing selected modes of a premium vision correction scheme according to a first example embodiment of the invention.

Before describing details of the invention, some background explanation will be provided. FIG. 1 graphically depicts the Zernike modes up to the tenth order, with the modes arranged in the shape of a pyramid. The radial order increases in sequentially lower-positioned rows and the angular frequency increases in sequentially outer-positioned columns. Table 1 lists the Zernike functions up to the seventh order:

TABLE 1

Listing of Zernike Polynomials in Polar Coordinates up to $7^{th}$ order (36 terms).

| j = index | n = order | m = frequency | $Z_n^m(\rho, \theta)$ |
|---|---|---|---|
| 0 | 0 | 0 | 1 |

TABLE 1-continued

Listing of Zernike Polynomials in Polar Coordinates up to 7$^{th}$ order (36 terms).

| j = index | n = order | m = frequency | $Z_n^m (\rho, \theta)$ |
|---|---|---|---|
| 1 | 1 | −1 | $2 \rho \sin \theta$ |
| 2 | 1 | 1 | $2 \rho \cos \theta$ |
| 3 | 2 | −2 | $\sqrt{6}\rho^2 \sin 2\theta$ |
| 4 | 2 | 0 | $\sqrt{3}(2\rho^2 − 1)$ |
| 5 | 2 | 2 | $\sqrt{6}\rho^2 \cos 2\theta$ |
| 6 | 3 | −3 | $\sqrt{8}\rho^3 \sin 3\theta$ |
| 7 | 3 | −1 | $\sqrt{8}(3\rho^3 − 2\rho) \sin \theta$ |
| 8 | 3 | 1 | $\sqrt{8}(3\rho^3 − 2\rho) \cos \theta$ |
| 9 | 3 | 3 | $\sqrt{8}\rho^3 \cos 3\theta$ |
| 10 | 4 | −4 | $\sqrt{10}\rho^4 \sin 4\theta$ |
| 11 | 4 | −2 | $\sqrt{10}(4\rho^4 − 3\rho^2) \sin 2\theta$ |
| 12 | 4 | 0 | $\sqrt{5}(6\rho^4 − 6\rho^2 + 1)$ |
| 13 | 4 | 2 | $\sqrt{10}(4\rho^4 − 3\rho^2) \cos 2\theta$ |
| 14 | 4 | 4 | $\sqrt{10}\rho^4 \cos 4\theta$ |
| 15 | 5 | −5 | $\sqrt{12}\rho^5 \sin 5\theta$ |
| 16 | 5 | −3 | $\sqrt{12}(5\rho^5 − 4\rho^3) \sin 3\theta$ |
| 17 | 5 | −1 | $\sqrt{12}(10\rho^5 − 12\rho^3 + 3\rho) \sin \theta$ |
| 18 | 5 | 1 | $\sqrt{12}(10\rho^5 − 12\rho^3 + 3\rho) \cos \theta$ |
| 19 | 5 | 3 | $\sqrt{12}(5\rho^5 − 4\rho^3) \cos 3\theta$ |
| 20 | 5 | 5 | $\sqrt{12}\rho^5 \cos 5\theta$ |
| 21 | 6 | −6 | $\sqrt{14}\rho^6 \sin 6\theta$ |
| 22 | 6 | −4 | $\sqrt{14}(6\rho^6 − 5\rho^4) \sin 4\theta$ |
| 23 | 6 | −2 | $\sqrt{14}(15\rho^6 − 20\rho^4 + 6\rho^2) \sin 2\theta$ |
| 24 | 6 | 0 | $\sqrt{7}(20\rho^6 − 30\rho^4 + 12\rho^2 − 1)$ |
| 25 | 6 | 2 | $\sqrt{14}(15\rho^6 − 20\rho^4 + 6\rho^2) \cos 2\theta$ |
| 26 | 6 | 4 | $\sqrt{14}(6\rho^6 − 5\rho^4) \cos 4\theta$ |
| 27 | 6 | 6 | $\sqrt{14}\rho^6 \cos 6\theta$ |
| 28 | 7 | −7 | $4 \rho^7 \sin 7\theta$ |
| 29 | 7 | −5 | $4 (7\rho^7 − 6\rho^5) \sin 5\theta$ |
| 30 | 7 | −3 | $4 (21\rho^7 − 30\rho^5 + 10\rho^3) \sin 3\theta$ |
| 31 | 7 | −1 | $4 (35\rho^7 − 60\rho^5 + 30\rho^3 − 4\rho) \sin \theta$ |
| 32 | 7 | 1 | $4 (35\rho^7 − 60\rho^5 + 30\rho^3 − 4\rho) \cos \theta$ |
| 33 | 7 | 3 | $4 (21\rho^7 − 30\rho^5 + 10\rho^3) \cos 3\theta$ |
| 34 | 7 | 5 | $4 (7\rho^7 − 6\rho^5) \cos 5\theta$ |
| 35 | 7 | 7 | $4 \rho^7 \cos 7\theta$ |

Generally, the functions in the middle column of FIG. 1 (e.g., indices 4, 12, etc. of Table 1) describe spherical aberrations, the functions in the two adjacent columns (e.g., indices 7, 8, 17, 18, etc.) describe coma aberrations, the functions in the next two columns out (e.g., indices 3, 5, 11, 13, etc.) describe astigmatic aberrations, and the functions in the next two columns out (e.g., indices 6, 9, 16, 19, etc.) describe trefoil aberrations. Several of the aberrations (indices 0, 1, and 2) are not optic-power related, so these are normally not corrected for. When referring to a single Zernike mode, this includes both the positive (+) and the negative (−) angular frequency components of an aberration set. For example, when referring to the second-order astigmatism mode, this is intended to include indices 3 and 5 collectively. This double-index scheme contains both aberration and axis information.

As mentioned above, correcting astigmatism has traditionally meant correcting the second-order astigmatic aberrations, which are Zernike mode indices 3 and 5, and which are referred to as reference character 10 in FIG. 1. And correcting myopia and hypermetropia is done by correcting for defocus. Defocus is composed of axi-symmetrical Zernike indices 4, 12 and 24, but Zernike index 4, referred to as reference character 8 in FIG. 1, is the primary spherical power component and is thus the only mode traditionally corrected for. Astigmatic terms are considered only in terms of alternate representations of sphero-cylindrical power. Traditional phoropters are not able to measure aberrations of a higher order than second-order astigmatism and defocus. The standardized astigmatic corrections begin at −0.75 Diopter ("D") and increment in 0.5 D or 0.75 D steps, so the correction provided is only a general approximation of the actual astigmatic aberration of the eye.

Turning now to the details of the invention, FIG. 1 shows a premium vision correction scheme 14 according to a first example embodiment of the invention. An ophthalmic lens provided with this premium vision correction scheme 14 has a correction for second-order astigmatism 10 combined with a correction for fourth-order spherical aberration 12. For preferable results, these corrections are customized to the individual eye and made precisely to correct to close to 0.0 D (e.g., −0.45 D astigmatism and −1.9 D spherical aberration, or −0.96 D astigmatism and −1.5 D spherical aberration), instead of being general approximations (e.g., astigmatism "rounded off" to a standardized −1.5 D or −0.75 D correction, or the spherical correction being in only 0.25 D increments). The combination of these customized precise corrections for astigmatism and spherical aberration 10 and 12, respectively provides significantly enhanced "premium" vision, which can be practical and cost-effective to achieve.

Figure 2:
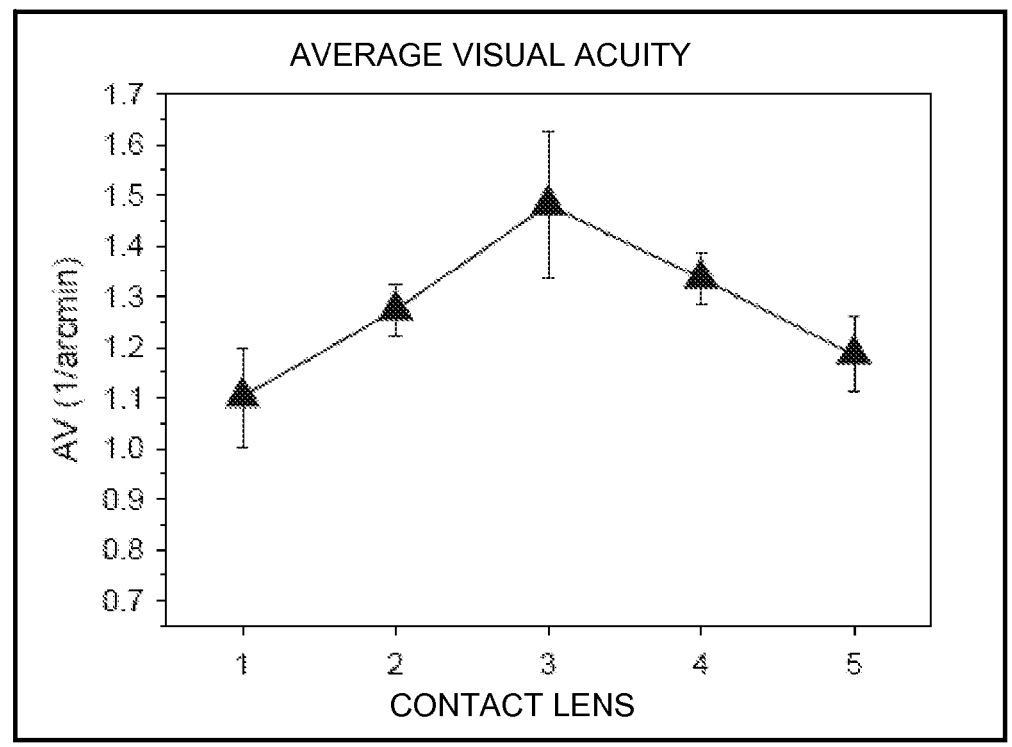
FIG. 2 is a graphical depiction of visual acuity measurements of test subjects wearing five test lenses, with lens 3 including the premium vision correction scheme of FIG. 1.
Figure 3:
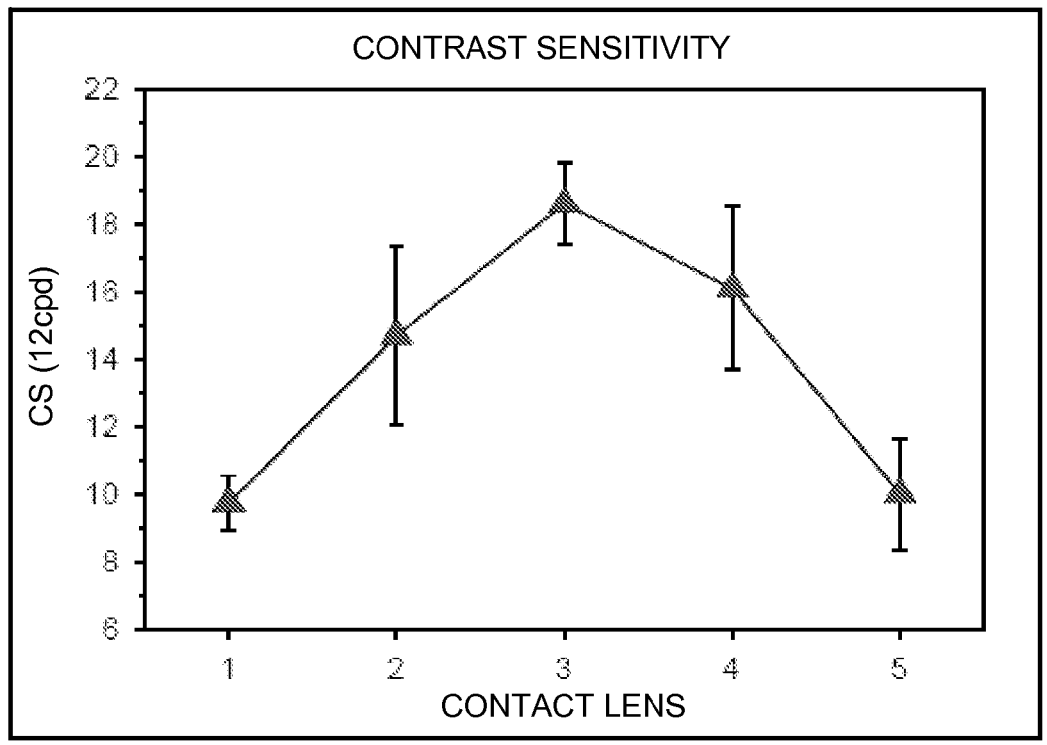
FIG. 3 is a graphical depiction of contrast sensitivity measurements of test subjects wearing five test lenses, with lens 3 including the premium vision correction scheme of FIG. 1.

Test data demonstrating the benefits of the premium vision scheme 14 are shown in FIGS. 2 and 3. In the study, three test subjects were each provided with five different lenses. The lenses included customized corrections for each test subject to the Diopter levels (lens+eye) shown in Table 2:

TABLE 2

Test Lens Corrections (6 mm pupil)

| Lens | Spherical Aberration | Astigmatism Aberration |
|---|---|---|
| 1 | −1.25 D | 0.0 D |
| 2 | −0.5 D | 0.0 D |
| 3 | 0.0 D | 0.0 D |
| 4 | +0.5 D | 0.0 D |
| 5 | +1.25 D | 0.0 D |

Lenses 1 and 5 included precise customized corrections for astigmatism 10 but little or no correction for spherical aberration 12. Lens 3 included precise customized corrections for both astigmatism 10 and for spherical aberration 12, according to the premium vision scheme 14. And lenses 2 and 4 included precise customized corrections for astigmatism 10 and moderate corrections for spherical aberration 12.

As used herein, "precise" corrections are corrections made to close to 0.0 D. Due to limitations in current equipment, it is not yet possible to repeatably and predictably make corrections to exactly 0.0 D. Because of the eye's accommodative ability on the minus side, it is generally preferable to err on the minus side of 0.0 D. For preferable results, precise corrections are those made to between about −0.2 D and about +0.1 D. For most-preferable results, precise corrections are those made to between about −0.1 D and about +0.05 D.

Visual acuity and contrast sensitivity were measured for the test subjects when wearing each of the five lenses customized for them. The test results are depicted graphically in FIGS. 2 and 3. As shown in the figures, visual acuity and contrast sensitivity were significantly improved for the test subjects when they were wearing lens 3 with the premium vision correction scheme 14. The typical uncorrected adult eye exhibits about +1.0 D of spherical aberration for a 6 mm pupil. And a typical adult eye corrected with a −2.5 D spherical contact lens exhibits about +0.5 D of spherical aberration for a 6 mm pupil. Therefore, the subjects' vision quality when wearing lens 5 was about the same as or slightly worse than the typical uncorrected eye, and their vision with lens 4 was about the same as many typical corrected eyes. As can be seen from the figures, the test subjects wearing lens 3 experienced about 25% higher visual acuity and about 85% higher contrast sensitivity, relative to when wearing lens 5. And the test subjects wearing lens 3 experienced about 11% higher visual acuity and about 15% higher contrast sensitivity, relative to when wearing lens 4.

In general, the test data showed that correction for spherical aberration 12 to less that 1.25 D does not have a discernable visual benefit unless astigmatism 10 is also corrected to less than 0.25 D. Typically, astigmatism 10 less than 0.75 D is not corrected with contact lenses. However, the test data shows that precise correction of astigmatic aberration modes 10 is a prerequisite to realizing enhanced vision when correcting spherical aberration 12.

Lenses with corrections for second-order astigmatism 10 require an orientation feature to maintain a predetermined rotational orientation on the eye, as is commonly provided in toroidal lenses. But lenses with corrections for second-order astigmatism 10 do not require registration to the eye's line-of-sight. Fourth-order spherical aberration 12 does not have an angular component, so lenses with this correction need not be oriented on the eye or be registered to the eye's line-of-sight. So lenses with the premium vision correction scheme 14 include an orientation feature to maintain a predetermined rotational orientation on the eye, but do not necessarily need to be registered to the eye's line-of-sight. Thus, lenses with the premium vision correction scheme 14 can be made simply and economically using known fabrication techniques. In addition, the optic zones with the corrections for the aberrations can be adjusted on the lens to correspond to any rotation and/or decentration of the lens relative to the eye's line of sight.

In addition, it should be noted that the test subjects each had additional higher-order aberrations that were not corrected for. Correcting aberrations of a higher order and/or frequency would generally further enhance vision, but the results of the study suggest that further corrections of most higher order and/or frequency aberrations would not significantly enhance vision, and would be difficult and costly to provide. A few higher order and/or frequency aberration corrections can provide cost-effective benefits in some cases, and these will now be described.

Figure 4:
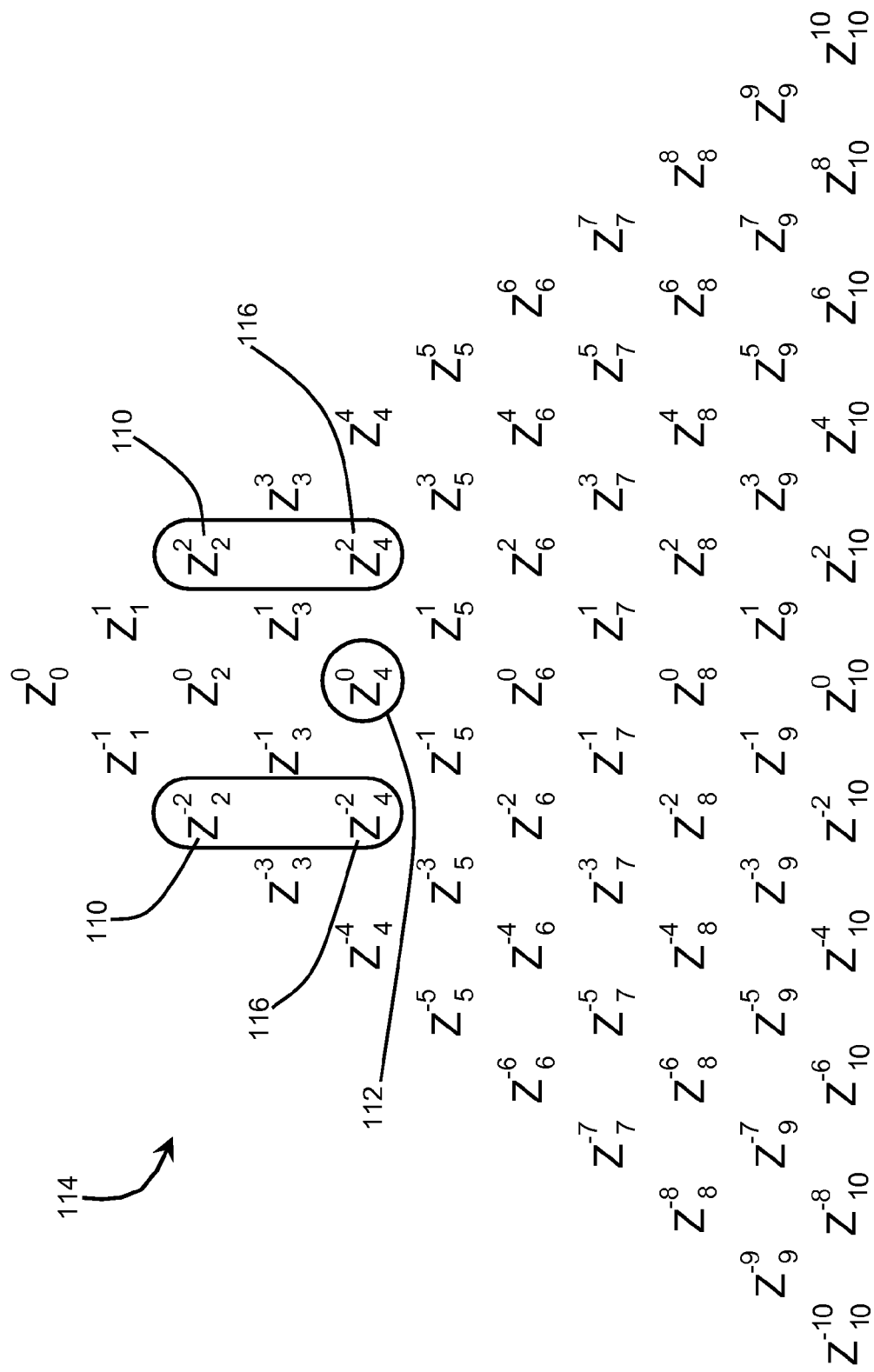
FIG. 4 is a graphical depiction of Zernike modes arranged in a pyramid, showing selected modes of a premium vision correction scheme according to a second example embodiment of the invention.

FIG. 4 shows a premium vision correction scheme 114 according to a second example embodiment of the invention. An ophthalmic lens provided with this premium vision correction scheme 114 has a correction for second-order astigmatism 110 combined with a correction for fourth-order spherical aberration 112, similarly to the first example embodiment. In addition, in this premium vision scheme 114 corrections are also included for fourth-order astigmatism 116. For many persons, this additional correction will not provide a discernable improvement to their vision, and is not worth the added cost required. But for persons with relatively large magnitude fourth-order astigmatism aberrations 116 (i.e., high coefficients in the Zernike polynomials), this will discernably enhance their vision, particularly their night vision (fourth-order astigmatism is pupil-dependent). Adding the correction for fourth-order astigmatism 116 does not make the lens much more difficult to fabricate because the order and frequency of this aberration (n=4, m=−2/+2) are no higher than those of the fourth-order spherical aberration 112 (n=4) and the second-order astigmatism 110 (m=−2/+2) already being corrected for. For preferable results, all of these corrections are customized to the individual eye and made precisely to correct to close to 0.0 D.

Figure 5:
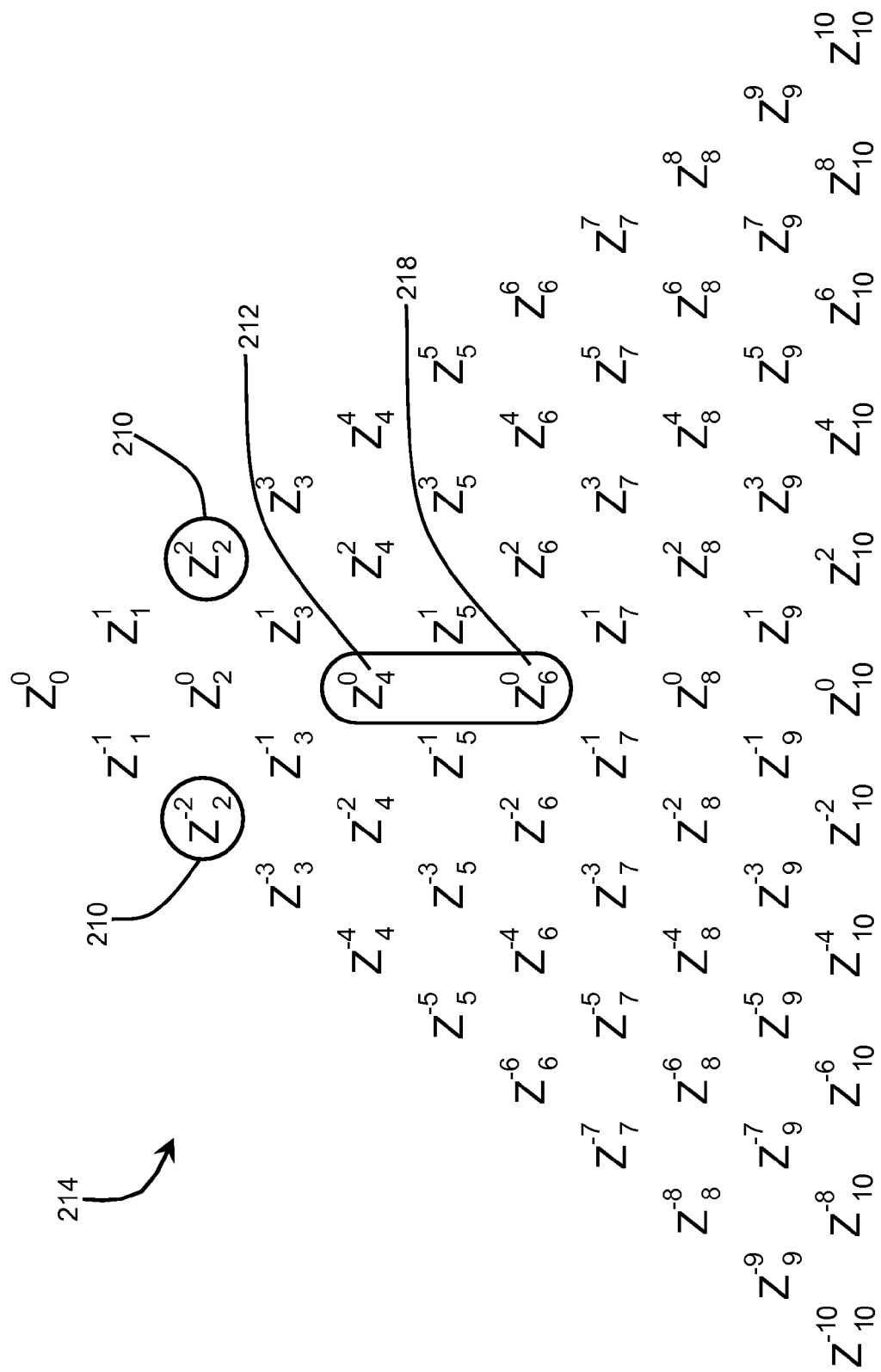
FIG. 5 is a graphical depiction of Zernike modes arranged in a pyramid, showing selected modes of a premium vision correction scheme according to a third example embodiment of the invention.

FIG. 5 shows a premium vision correction scheme 214 according to a third example embodiment of the invention. An ophthalmic lens provided with this premium vision correction scheme 214 has a correction for second-order astigmatism 210 combined with a correction for fourth-order spherical aberration 212, similarly to the first example embodiment. In addition, in this premium vision scheme 214 correction is also included for sixth-order spherical aberration 218. For many persons, this additional correction will not provide a discernable improvement to their vision, and is not worth the added cost required. But for persons with relatively large magnitude sixth-order spherical aberrations 218, this will discernably enhance their vision. Adding the correction for spherical aberration 218 does not make the lens too much more complex because, although this is a sixth order function, it has no angular component (m=0). For preferable results, all of these corrections are customized to the individual eye and made precisely to correct to close to 0.0 D.

Figure 6:
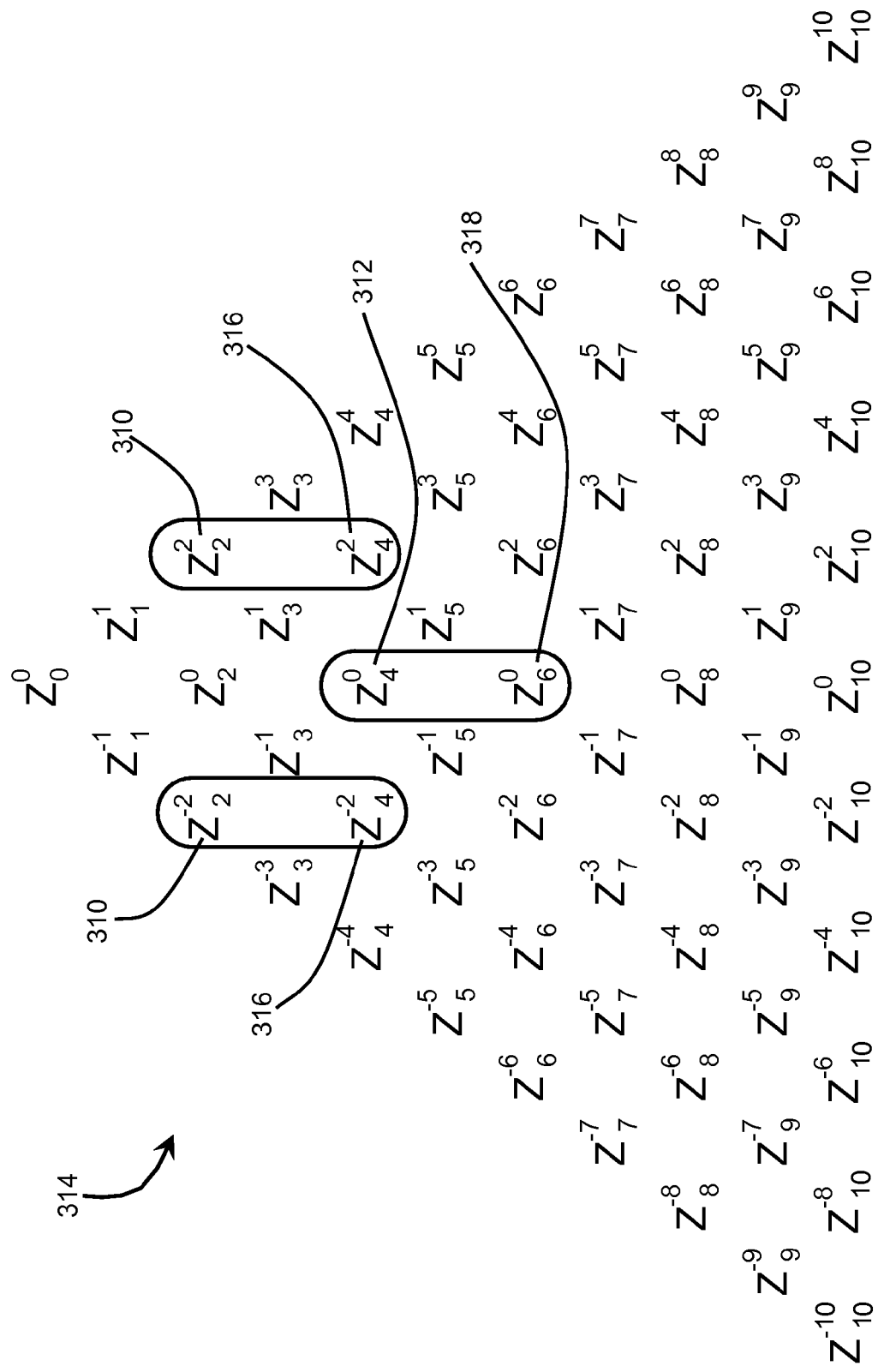
FIG. 6 is a graphical depiction of Zernike modes arranged in a pyramid, showing selected modes of a premium vision correction scheme according to a fourth example embodiment of the invention.

FIG. 6 shows a premium vision correction scheme 314 according to a fourth example embodiment of the invention. An ophthalmic lens provided with this premium vision correction scheme 314 has a correction for second-order astigmatism 310 combined with a correction for fourth-order spherical aberration 312, similarly to the first example embodiment. In addition, in this premium vision scheme 314 corrections are also included for fourth-order astigmatism 316 and sixth-order spherical aberration 318. As discussed above, for many persons these additional corrections will not provide a discernable improvement to their vision, and is not worth the added cost required. But for persons with relatively large magnitude fourth-order astigmatism aberrations 316 and spherical aberrations 318, this will discernably enhance their vision, without rendering the resulting lens impractical to fabricate. For preferable results, all of these corrections are customized to the individual eye and made precisely to correct to close to 0.0 D.

Figure 7:
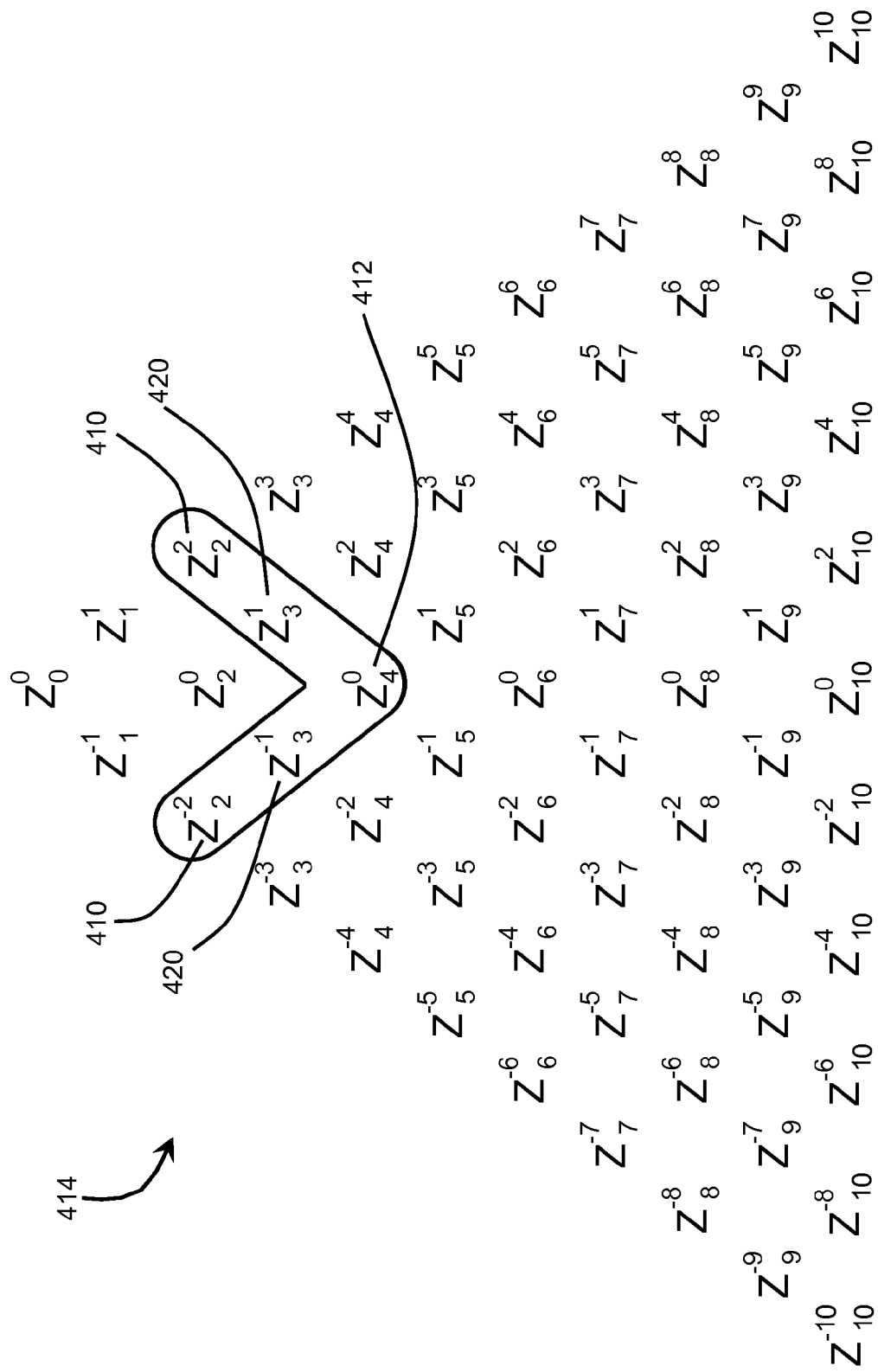
FIG. 7 is a graphical depiction of Zernike modes arranged in a pyramid, showing selected modes of a premium vision correction scheme according to a fifth example embodiment of the invention.

FIG. 7 shows a premium vision correction scheme 414 according to a fifth example embodiment of the invention. An ophthalmic lens provided with this premium vision correction scheme 414 has a correction for second-order astigmatism 410 combined with a correction for fourth-order spherical aberration 412, similarly to the first example embodiment. In addition, in this premium vision scheme 414 corrections are also included for third-order coma aberrations 420. For many persons, this additional correction will not provide a discernable improvement to their vision, and is not worth the added cost required. But for persons with relatively large magnitude third-order coma aberrations 420, particularly horizontal coma aberrations, this will discernibly enhance their vision, without rendering the resulting lens impractical to fabricate. For preferable results, all of these corrections are customized to the individual eye and made precisely to correct to close to 0.0 D.

Figure 8:
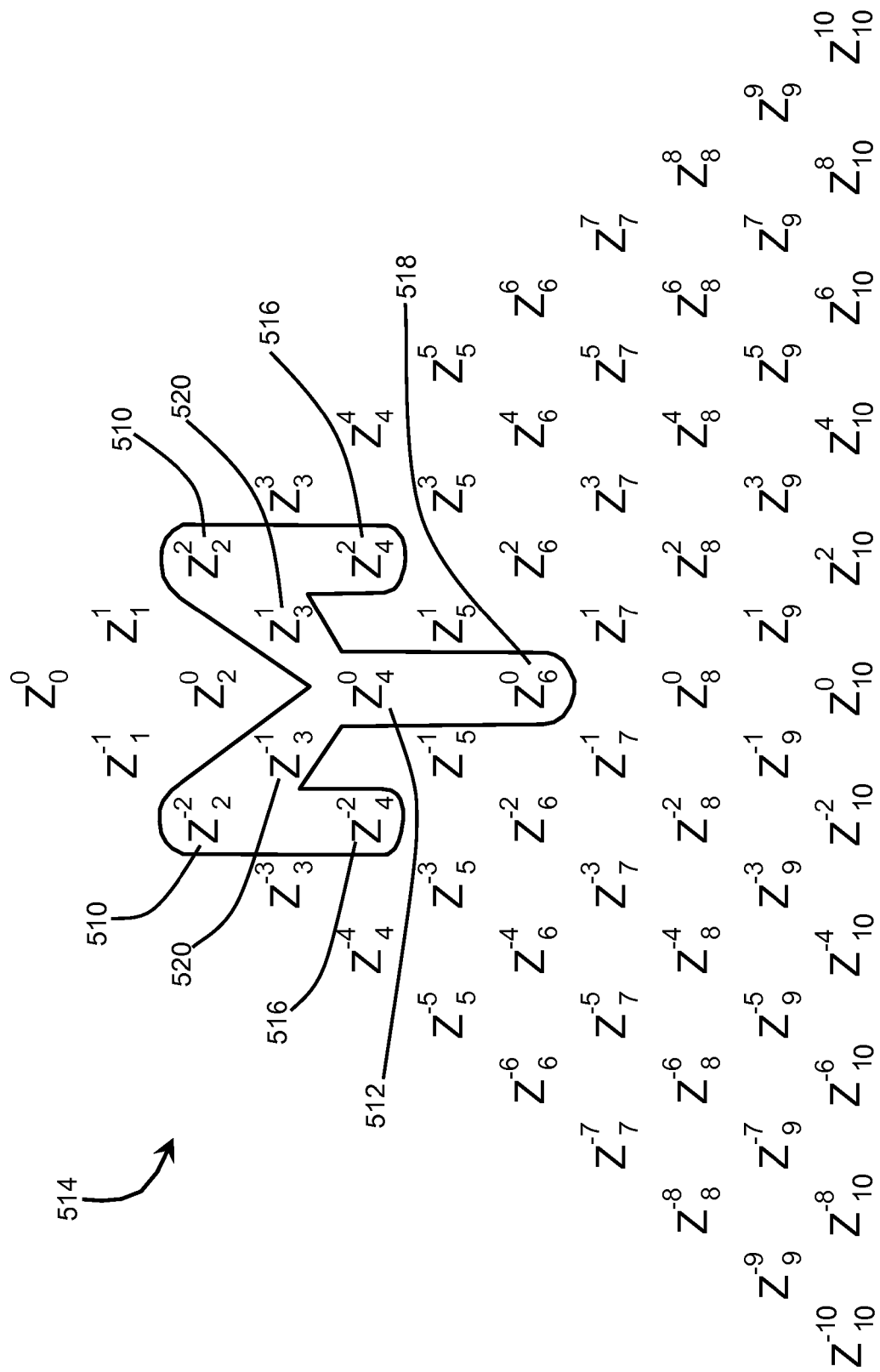
FIG. 8 is a graphical depiction of Zernike modes arranged in a pyramid, showing selected modes of a premium vision correction scheme according to a sixth example embodiment of the invention.

FIG. 8 shows a premium vision correction scheme 514 according to a sixth example embodiment of the invention. An ophthalmic lens provided with this premium vision correction scheme 514 has a correction for second-order astigmatism 510 combined with a correction for fourth-order spherical aberration 512, similarly to the first example embodiment. In addition, in this premium vision scheme 514 corrections are also included for fourth-order astigmatism 516, sixth-order spherical aberration 518, and third-order coma aberrations 520. It is believed that this correction scheme 514 will probably not be commonly used, but nevertheless for some individuals it can be used to enhance to their vision. For preferable results, all of these corrections are customized to the individual eye and made precisely to correct to close to 0.0 D.

Each of the various example premium vision correction schemes described herein can be implemented in various ways. For example, as described above, the premium vision correction schemes are embodied in toric contact lenses, with each lens 40 having at least one refractive surface 42 with the corrections (see FIG. 9). In addition, the premium vision correction schemes may be embodied in other ophthalmic lenses including simultaneous-vision presbyopic contact lenses, other contact lenses, or intraocular lenses (IOLs), or may be implemented by laser refractive surgery.

For simultaneous-vision presbyopic lenses, the premium vision correction schemes can be applied to increase the visual margin to the distance zone or zones. The additional progressive zone or zones modifies the power profile, and in turn, the optical system transfer function. Test data from the study described above has shown that low spatial frequency spherical aberration, typical of the human eye, does not increase the eye's depth-of-focus. Therefore, it is preferable to compensate for this spherical aberration and astigmatism of the presbyopic eye to less than 0.25 D for simultaneous vision lenses, thus increasing the visual margin. Corrections for high spatial frequency aberrations (progressive zones) and aberrations to increase depth-of-focus without decreasing visual quality can then be added to the lens for presbyopic correction.

In another aspect of the present invention, there is provided a method of prescribing a customized ophthalmic lens with a premium vision correction. Referring to FIG. 10, the method 50 includes at step 52 determining refractive errors in an eye, with the errors (aberrations) expressed as Zernike modes. This may be done in different ways, depending on the premium vision correction scheme applied. When applying the first example premium vision correction scheme 14, the second-order astigmatism 10 can be measured using a conventional phoropter, with the fourth-order spherical aberration 12 estimated from the individual's age, by the difference in subjective refraction for small and large pupils, or using other relevant data. To convert the astigmatism measurement to Zernike modes, the pupil diameter must be known, so a pupil camera or like device would need to be used as well. Also, conventional phoropters only measure in 0.25 D increments, making this not as desirable of an approach.

Preferably, for any of the premium vision correction schemes described herein, the eye's refractive error is determined by precise measurement using a conventional ophthalmic wavefront sensor or equivalent system, which are known in the art. Conventional wavefront sensors are operable to measure the higher-order aberrations corrected for in the second through sixth example premium vision schemes. One suitable wavefront sensor system is described in U.S. Pat. No. 5,777,719 to Williams, which is hereby incorporated by reference herein, and another is commercially available under the brand name ZYWAVE by Bausch & Lomb Incorporated (Rochester, N.Y.). The system of U.S. Pat. No. 5,777,719 measures Zernike modes up to and including the tenth order, while the ZYWAVE system measures Zernike modes up to and including the fifth order. Generally described, wavefront sensors (e.g., a Shack-Hartmann wavefront sensor) can be used to detect refractive errors in the eye. The wavefront sensor shines a narrow cone of light, from a laser diode or LED, on the retina and fits any refractive errors to the Zernike indices. Starting at the retina, an ideal wavefront is generated which passes through the optical path of the eye. As the wavefront exits the eye, it contains a complete map of the eye's aberrations for analysis by the sensor. Once the wavefront is received by the sensor, a complex series of analyses is performed to provide a "complete" picture of the eye's optical path.

Next, at step 54, a premium vision correction scheme is selected with particular aberrations, expressed as Zernike modes, that will be corrected for. Any of the premium vision correction schemes described herein can be used. The first example premium vision correction scheme, in which the only aberrations corrected are second-order astigmatism and fourth-order spherical aberration, will in many or even most cases provide the premium vision sought. In cases where the fourth-order astigmatism, the sixth-order spherical aberration, and/or the third-order coma have relatively large magnitudes, where the third-order coma aberration is horizontal, and/or where the fourth-order astigmatism is relatively large and the eye has a relatively large pupil, one of the second through eighth example premium vision correction schemes may be selected. Alternatively, one of the premium vision correction schemes can be selected as a standard for regular use, in which case the step of selecting the scheme is done in advance of measuring the eye's refractive errors.

At step 56, a customized lens with the premium vision correction scheme is prescribed for the patient. This step, as well as the other steps in the method, are typically done by an eye-care professional. Subsequently, a customized lens is fabricated based on the prescription, as described below.

In addition, the method of prescribing can additionally include adjusting the registration of the lens so that the orientation of the optic zones with corrections for astigmatic and coma aberrations corresponds to on the actual orientation of the lens on the patient. Even in toric lenses with features for preventing rotation and for maintaining registration to the eye's line-of-sight, there is still a small amount of movement of the lens on the eye. For example, it is not uncommon for toric lenses to rotate as much as 5 degrees on the eye or to get decentered on the eye. To account for this, the method can include the additional steps of providing the patient with a test lens and then measuring the rotation and/or decentration of the lens on the eye. Then, when issuing the prescription, it can include prescribing the optic zones with the corrections for the aberrations being rotated and/or decentered to correspond to the measured test lens rotation and/or decentration. In this way, when a prescribed lens (of the same type as the test lens) is made according to the prescription, the optic zones with the corrections will more closely align with the aberrations of the eye to further contribute to the patient experiencing premium vision.

In yet another aspect of the present invention, there is provided a method of manufacturing an ophthalmic lens with a premium vision correction. Referring to FIG. 11, the method 60 includes at step 62 determining corrections to be included in the ophthalmic lens. In one approach, the lens is customized to a particular individual, and this step can be accomplished by the lens-prescribing method 50 just described. In another approach, the lenses can be made with standardized corrections for the higher-volume prescriptions, and with the corrections less precise (e.g., in 0.1 or 0.25 D increments). The higher-volume prescriptions can be determined based on historical data or by conducting a study of the population, with the data based on age and other relevant factors.

Next, at step 64, the lens is fabricated to include those corrections. The lens fabrication can be done using conventional systems known in the art. Preferably, the lens is fabricated using a single-point diamond cutting system, such as is described in U.S. Pat. No. 7,111,938 owned by Novartis AG, which is hereby incorporated by reference herein. In addition, the lens is preferably fabricated of lathable silicon hydrogel.

Accordingly, it can be seen that the present invention provides a number of advantages over conventional optic correction techniques. Advantageously, one aspect of the invention provides premium vision correction schemes that can be implemented in ophthalmic lenses to provide significantly enhanced "premium" vision in a practical and cost-effective manner. Other aspects of the invention provide methods for prescribing and fabricating customized lenses using one of the premium vision correction schemes, advantageously maximizing the visual benefits while permitting mass customization and allowing higher tolerances for lens registration to the eye's line-of-sight.

While the invention has been described with reference to preferred and example embodiments, it will be understood by those skilled in the art that a variety of modifications, additions and deletions are within the scope of the invention, as defined by the following claims.

What is claimed is:

1. A premium vision ophthalmic lens for wearing on an eye, comprising: a refractive surface with optic-power corrections for aberrations in refractive surfaces of the eye, wherein the optic-power aberration corrections comprise simultaneous corrections for second-order astigmatism and at least one aberration expressed as a Zernike mode, wherein the at least one aberrations corrected-for are selected from the group comprising fourth-order spherical aberration, fourth-order astigmatism, sixth-order spherical aberration and third-order coma, wherein the aberration corrections are designed to correspond to decentration of the lens relative to the pupil of the eye; and an orientation feature to maintain a predetermined rotational orientation on the eye.

2. The premium vision ophthalmic lens of claim 1, wherein the optic-power corrections comprise simultaneous corrections for second-order astigmatism and fourth-order spherical aberration.

3. The premium vision ophthalmic lens of claim 2, wherein the optic-power corrections further comprise a simultaneous correction for fourth-order astigmatism.

4. The premium vision ophthalmic lens of claim 3, wherein the optic-power corrections further comprise a simultaneous correction for sixth-order spherical aberration.

5. The premium vision ophthalmic lens of claim 4, wherein the optic-power corrections further comprise a simultaneous correction for third-order coma.

6. The premium vision ophthalmic lens of claim 2, wherein the optic-power corrections further comprise a simultaneous correction for sixth-order spherical aberration.

7. The premium vision ophthalmic lens of claim 2, wherein the optic-power corrections further comprise a simultaneous correction for third-order coma.

8. The premium vision ophthalmic lens of claim 2, wherein the optic-power corrections are made precisely to cancel out the aberrations to between about −0.2 D and about +0.1 D.

9. The premium vision ophthalmic lens of claim 8, wherein the optic-power corrections are made precisely to cancel out the aberrations to between about −0.1 D and about +0.05 D.

10. A premium vision ophthalmic lens for wearing on an eye, comprising: a refractive surface with optic-power corrections for aberrations in refractive surfaces of the eye, wherein the optic-power aberration corrections comprise simultaneous corrections for astigmatism and two or fewer aberrations expressed as Zernike modes, wherein the aberration-corrections are designed to correspond to decentration of the lens relative to the pupil of the eye, and an orientation feature to maintain a predetermined rotational orientation on the eye.

11. The premium vision ophthalmic lens of claim 10, wherein the optic-power corrections consist of simultaneous corrections for only second-order astigmatism and fourth-order spherical aberration.

12. The premium vision ophthalmic lens of claim 10, wherein the optic-power corrections comprise simultaneous corrections for second-order astigmatism and fourth-order spherical aberration, and further comprise a simultaneous correction for an aberration selected from the group consisting of fourth-order astigmatism, sixth-order spherical aberration and third-order coma.

13. The premium vision ophthalmic lens of claim 12, wherein the optic-power correction further selected is a simultaneous correction for sixth-order spherical aberration.

14. The premium vision ophthalmic lens of claim 12, wherein the optic-power correction further selected is a simultaneous correction for third-order coma.

15. The premium vision ophthalmic lens of claim 12, wherein the optic-power correction further selected is a simultaneous correction for fourth-order astigmatism.

16. The premium vision ophthalmic lens of claim 12, wherein the optic-power corrections are made precisely to cancel out the aberrations to between about −0.2 D and about +0.1 D.

17. The premium vision ophthalmic lens of claim 16, wherein the optic-power corrections are made precisely to cancel out the aberrations to between about −0.1 D and about +0.05 D.

18. A method of prescribing a customized ophthalmic lens with a premium vision correction that is wearable on the eye, comprising: determining optic-power refractive aberrations in an eye of a patient, with the aberrations expressed as Zernike modes; selecting a premium vision correction scheme for simultaneously correcting two to five of the optic-power aberrations; providing a test lens to the patient and measuring rotation of the test lens on the eye; and issuing a prescription to the patient for a lens with precise corrections for the selected aberrations; wherein the step of issuing a prescription further comprises prescribing a lens with at least one optic zone with an aberration correction for at least astigmatism within the optic zone rotated to correspond to the measured test lens rotation; wherein the aberration corrections are designed to correspond to decentration of the lens relative to the pupil of the eye.

19. The method of claim 18, wherein the step of determining refractive aberrations comprises measuring the aberrations using a wavefront sensor system.

20. The method of claim 18, wherein the step of selecting a premium vision correction scheme comprises selecting corrections for only second-order astigmatism and fourth-order spherical aberration.

21. The method of claim 18, wherein the step of selecting a premium vision correction scheme comprises selecting corrections for second-order astigmatism and fourth-order spherical aberration and further selecting at least one additional simultaneous correction selected from the group consisting of fourth-order astigmatism, sixth-order spherical aberration, and third-order coma.

22. The method of claim 18, further comprising providing measuring decentration of the test lens on the eye, and wherein the step of issuing a prescription further comprises prescribing at least one optic zone with a correction for at least one of the aberrations with the optic zone decentered to correspond to the measured test lens decentration.

23. The method of claim 18, further comprising providing a test lens to the patient and measuring rotation and decentration of the test lens on the eye, and wherein the step of issuing a prescription further comprises prescribing at least one optic zone with a correction for at least one of the aberrations with the optic zone rotated and decentered to correspond to the measured test lens rotation and decentration.

24. A method of manufacturing an ophthalmic lens with a premium vision correction that is wearable on the eye, comprising: determining optic-power aberration corrections to be included in the ophthalmic lens, the corrections selected according to a premium vision correction scheme for simultaneously correcting two to five of the optic-power aberrations in an eye; prescribing a custom lens with precise corrections customized to the eye; and fabricating the lens with astigmatism and the selected corrections precisely made; wherein the aberration corrections are designed to correspond to decentration of the lens relative to the pupil of the eye.

25. The method of claim 24, wherein the step of determining optic-power corrections comprises selecting corrections for only second-order astigmatism and fourth-order spherical aberration.

26. The method of claim 24, wherein the step of determining optic-power corrections comprises selecting corrections for second-order astigmatism and fourth-order spherical aberration and further selecting at least one additional simultaneous correction selected from the group consisting of fourth-order astigmatism, sixth-order spherical aberration and third-order coma.

27. The method of claim 24, wherein the step of fabricating the lens comprises fabricating the lens of lathable silicon hydrogel.

28. The method of claim 24, wherein the step of fabricating the lens comprises fabricating the lens using a single-point diamond cutting system.

* * * * *